United States Patent
McDaniel et al.

(10) Patent No.: US 6,878,785 B2
(45) Date of Patent: Apr. 12, 2005

(54) ORGANOMETAL COMPOUND CATALYST

(75) Inventors: Max P. McDaniel, Bartlesville, OK (US); Kathy S. Collins, Bartlesville, OK (US); Gil R. Hawley, Dewey, OK (US); Michael D. Jensen, Bartlesville, OK (US); Elizabeth A. Benham, Bartlesville, OK (US); Anthony P. Eaton, Dewey, OK (US); Joel L. Martin, Bartlesville, OK (US); Christopher E. Wittner, Bartlesville, OK (US)

(73) Assignee: Phillips Petroleum Company, Bartlesville, OK (US)

( * ) Notice: Subject to any disclaimer, the term of this patent is extended or adjusted under 35 U.S.C. 154(b) by 0 days.

(21) Appl. No.: 10/390,497

(22) Filed: Mar. 17, 2003

(65) Prior Publication Data

US 2003/0171511 A1 Sep. 11, 2003

Related U.S. Application Data

(62) Division of application No. 09/454,975, filed on Dec. 3, 1999, now Pat. No. 6,548,442.

(51) Int. Cl.$^7$ .............................................. C08F 4/642
(52) U.S. Cl. ........................ 526/119; 526/114; 526/156; 526/348
(58) Field of Search ................................ 526/114, 119, 526/156, 348

(56) References Cited

U.S. PATENT DOCUMENTS 5,077,255 A * 12/1991 Welborn, Jr. ................. 502/104
6,165,929 A * 12/2000 McDaniel et al. ........... 502/117
6,410,659 B1 * 6/2002 Maddox et al. .............. 526/114

* cited by examiner

*Primary Examiner*—Roberto Rabago
(74) *Attorney, Agent, or Firm*—Womble Carlyle Sandridge & Rice, PLLC

(57) ABSTRACT

This invention provides catalyst compositions that are useful for polymerizing at least one monomer to produce a polymer. This invention also provides catalyst compositions that are useful for polymerizing at least one monomer to produce a polymer, wherein said catalyst composition comprises a post-contacted organometal compound, a post-contacted organoaluminum compound, and a post-contacted treated solid oxide compound.

16 Claims, No Drawings

ORGANOMETAL COMPOUND CATALYST

This application is a divisional application of U.S. patent application Ser. No. 09/454,975, now U.S. Pat. No. 6,548,442 filed Dec. 3, 1999, which is incorporated herein in its entirety by reference.

FIELD OF THE INVENTION

This invention is related to the field of organometal compound catalysts.

BACKGROUND OF THE INVENTION

The production of polymers is a multi-billion dollar business. This business produces billions of pounds of polymers each year. Millions of dollars have been spent on developing technologies that can add value to this business.

One of these technologies is called metallocene catalyst technology. Metallocene catalysts have been known since about 1958. However, their low productivity did not allow them to be commercialized. About 1975, it was discovered that contacting one part water with one part trimethylaluminum to form methyl aluminoxane, and then contacting such methyl aluminoxane with a metallocene compound, formed a metallocene catalyst that had greater activity. However, it was soon realized that large amounts of expensive methyl aluminoxane were needed to form an active metallocene catalyst. This has been a significant impediment to the commercialization of metallocene catalysts.

Fluoro-organo borate compounds have been use in place of large amounts of methyl aluminoxane. However, this is not satisfactory, since such borate compounds are very sensitive to poisons and decomposition, and can also be very expensive.

It should also be noted that having a heterogeneous catalyst is important. This is because heterogeneous catalysts are required for most modern commercial polymerization processes. Furthermore, heterogeneous catalysts can lead to the formation of substantially uniform polymer particles that have a high bulk density. These types of substantially uniformed particles are desirable because they improve the efficiency of polymer production and transportation. Efforts have been made to produce heterogeneous metallocene catalysts; however, these catalysts have not been entirely satisfactory.

Therefore, the inventors provide this invention to help solve these problems.

SUMMARY OF THE INVENTION

An object of this invention is to provide a process that produces a catalyst composition that can be used to polymerize at least one monomer to produce a polymer.

Another object of this invention is to provide the catalyst composition.

Another object of this invention is to provide a process comprising contacting at least one monomer and the catalyst composition under polymerization conditions to produce the polymer.

Another object of this invention is to provide an article that comprises the polymer produced with the catalyst composition of this invention.

In accordance with one embodiment of this invention, a process to produce a catalyst composition is provided. The process comprises (or optionally, "consists essentially of", or "consists of") contacting an organometal compound, an organoaluminum compound, and a treated solid oxide compound to produce the catalyst composition, wherein the organometal compound has the following general formula:

$$(X^1)(X^2)(X^3)(X^4)M^1$$

wherein $M^1$ is selected from the group consisting of titanium, zirconium, and hafnium;

wherein $(X^1)$ is independently selected from the group consisting of cyclopentadienyls, indenyls, fluorenyls, substituted cyclopentadienyls, substituted indenyls, and substituted fluorenyls;

wherein substituents on the substituted cyclopentadienyls, substituted indenyls, and substituted fluorenyls of $(X^1)$ are selected from the group consisting of aliphatic groups, cyclic groups, combinations of aliphatic and cyclic groups, silyl groups, alkyl halide groups, halides, organometallic groups, phosphorus groups, nitrogen groups, silicon, phosphorus, boron, germanium, and hydrogen;

wherein at least one substituent on $(X^1)$ can be a bridging group which connects $(X^1)$ and $(X^2)$;

wherein $(X^3)$ and $(X^4)$ are independently selected from the group consisting of halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic groups and substituted cyclic groups, amido groups, substituted amido groups, phosphido groups, substituted phosphido groups, alkyloxide groups, substituted alkyloxide groups, aryloxide groups, substituted aryloxide groups, organometals groups, and substituted organometals groups;

wherein $(X^2)$ is selected from the group consisting of cyclopentadienyls, indenyls, fluorenyls, substituted cyclopentadienyls, substituted indenyls, substituted fluorenyls, halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic groups and substituted cyclic groups, amido groups, substituted amido groups, phosphido groups, substituted phosphido groups, alkyloxide groups, substituted alkyloxide groups, aryloxide groups, substituted aryloxide groups, organometals groups, and substituted organometals groups;

wherein substituents on $(X^2)$ are selected from the group consisting of aliphatic groups, cyclic groups, combinations of aliphatic groups and cyclic groups, silyl groups, alkyl halide groups, halides, organometals groups, phosphorus groups, nitrogen groups, silicon, phosphorus, boron, germanium, and hydrogen;

wherein at least one substituent on $(X^2)$ can be a bridging group which connects $(X^1)$ and $(X^2)$;

wherein the organoaluminum compound has the following general formula:

$$Al(X^5)_n(X^6)_{3-n}$$

wherein $(X^5)$ is a hydrocarbyl having from 1–20 carbon atoms;

wherein $(X^6)$ is a halide, hydride, or alkoxide;

wherein "n" is a number from 1 to 3 inclusive; and wherein the treated solid oxide compound comprises at least one halogen, zirconium, and a solid oxide compound;

wherein the halogen is at least one selected from the group consisting of chlorine, bromine, and fluorine;

wherein the solid oxide compound is selected from the group consisting of alumina, aluminophosphate, aluminosilicate, and mixtures thereof.

In accordance with another embodiment of this invention, a process is provided comprising contacting at least one monomer and the catalyst composition under polymerization conditions to produce a polymer. 33

In accordance with another embodiment of this invention, an article is provided. The article comprises the polymer produced in accordance with this invention.

These objects, and other objects, will become more apparent to those with ordinary skill in the art after reading this disclosure.

DETAILED DESCRIPTION OF THE INVENTION

Organometal compounds used in this invention have the following general formula:

$$(X^1)(X^2)(X^3)(X^4)M^1$$

In this formula, $M^1$ is selected from the group consisting of titanium, zirconium, and hafnium. Currently, it is most preferred when $M^1$ is zirconium.

In this formula, $(X^1)$ is independently selected from the group consisting of (hereafter "Group OMC-I") cyclopentadienyls, indenyls, fluorenyls, substituted cyclopentadienyls, substituted indenyls, such as, for example, tetrahydroindenyls, and substituted fluorenyls, such as, for example, octahydrofluorenyls.

Substituents on the substituted cyclopentadienyls, substituted indenyls, and substituted fluorenyls of $(X^1)$ can be selected independently from the group consisting of aliphatic groups, cyclic groups, combinations of aliphatic and cyclic groups, silyl groups, alkyl halide groups, halides, organometals groups, phosphorus groups, nitrogen groups, silicon, phosphorus, boron, germanium, and hydrogen, as long as these groups do not substantially, and adversely, affect the polymerization activity of the catalyst composition.

Suitable examples of aliphatic groups are hydrocarbyls, such as, for example, paraffins and olefins. Suitable examples of cyclic groups are cycloparaffins, cycloolefins, cycloacetylenes, and arenes. Substituted silyl groups include, but are not limited to, alkylsilyl groups where each alkyl group contains from 1 to about 12 carbon atoms, arylsilyl groups, and arylalkylsilyl groups. Suitable alkyl halide groups have alkyl groups with 1 to about 12 carbon atoms. Suitable organometals groups include, but are not limited to, substituted silyl derivatives, substituted tin groups, substituted germanium groups, and substituted boron groups.

Suitable examples of such substituents are methyl, ethyl, propyl, butyl, tert-butyl, isobutyl, amyl, isoamyl, hexyl, cyclohexyl, heptyl, octyl, nonyl, decyl, dodecyl, 2-ethylhexyl, pentenyl, butenyl, phenyl, chloro, bromo, iodo, trimethylsilyl, and phenyloctylsilyl.

In this formula, $(X^3)$ and $(X^4)$ are independently selected from the group consisting of (hereafter "Group OMC-II") halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic and substituted cyclic groups, amido groups, substituted amido groups, phosphido groups, substituted phosphido groups, alkyloxide groups, substituted alkyloxide groups, aryloxide groups, substituted aryloxide groups, organometals groups, and substituted organometals groups, as long as these groups do not substantially, and adversely, affect the polymerization activity of the catalyst composition.

Suitable examples of aliphatic groups are hydrocarbyls, such as, for example, paraffins and olefins. Suitable examples of cyclic groups are cycloparaffins, cycloolefins, cycloacetylenes, and arenes. Currently, it is preferred when $(X^3)$ and $(X^4)$ are selected from the group consisting of halides and hydrocarbyls, where such hydrocarbyls have from 1 to about 10 carbon atoms. However, it is most preferred when $(X^3)$ and $(X^4)$ are selected from the group consisting of fluoro, chloro, and methyl.

In this formula, $(X^2)$ can be selected from either Group OMC-I or Group OMC-II.

At least one substituent on $(X^1)$ or $(X^2)$ can be a bridging group that connects $(X^1)$ and $(X^2)$, as long as the bridging group does not substantially, and adversely, affect the activity of the catalyst composition. Suitable bridging groups include, but are not limited to, aliphatic groups, cyclic groups, combinations of aliphatic groups and cyclic groups, phosphorous groups, nitrogen groups, organometals groups, silicon, phosphorus, boron, and germanium.

Suitable examples of aliphatic groups are hydrocarbyls, such as, for example, paraffins and olefins. Suitable examples of cyclic groups are cycloparaffins, cycloolefins, cycloacetylenes, and arenes. Suitable organometals groups include, but are not limited to, substituted silyl derivatives, substituted tin groups, substituted germanium groups, and substituted boron groups.

Various processes are known to make these organometal compounds; See, for example, U.S. Pat. Nos. 4,939,217; 5,210,352; 5,436,305; 5,401,817; 5,631,335; 5,571,880; 5,191,132; 5,480,848; 5,399,636; 5,565,592; 5,347,026; 5,594,078; 5498,581; 5,496,781; 5,563,284; 5,554,795; 5,420,320; 5,451,649; 5,541,272; 5,705,478; 5,631,203; 5,654,454; 5,705,579; and 5,668,230; the entire disclosures of which are hereby incorporated by reference.

Specific examples of such organometal compounds are as follows:

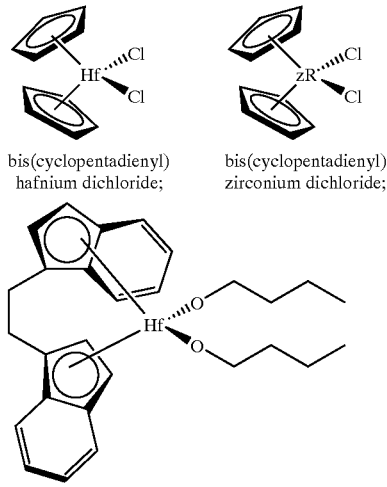

bis(cyclopentadienyl) hafnium dichloride;

bis(cyclopentadienyl) zirconium dichloride;

1,2-ethanediylbis($\eta^5$-1-indenyl)di-n-butoxyhafnium;

-continued

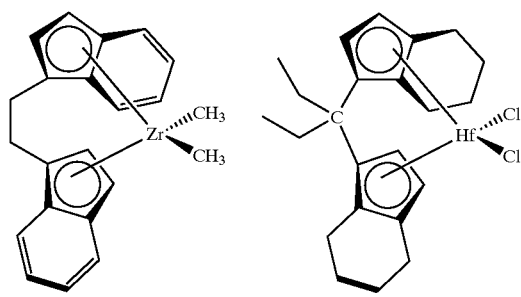

1,2-ethanediylbis(η⁵-1-indenyl)dimethylzirconium;

3,3-pentanediylbis(η⁵-4,5,6,7-tetrahydro-1-indenyl)hafnium dichloride;

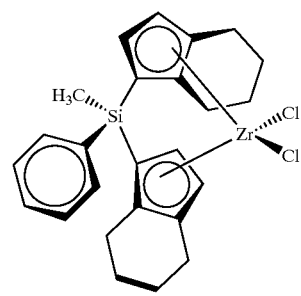

methylphenylsilylbis(η⁵-4,5,6,7-tetrahydro-1-indenyl)zirconium dichloride;

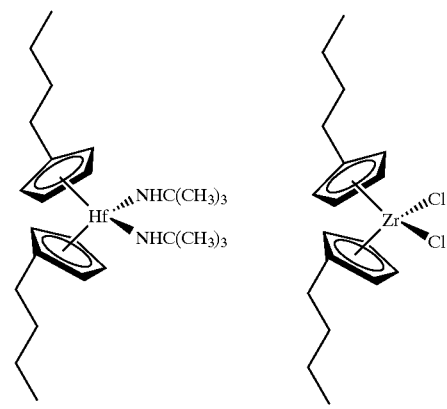

bis(n-butylcyclopentadienyl)bis(di-t-butylamido hafnium;

bis(n-butylcyclopentadienyl)zirconium dichloride;

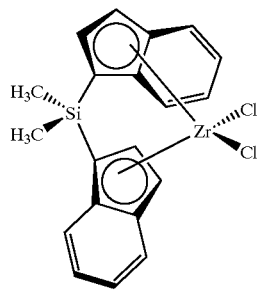

dimethylsilylbis(1-indenyl)zirconium dichloride;

-continued

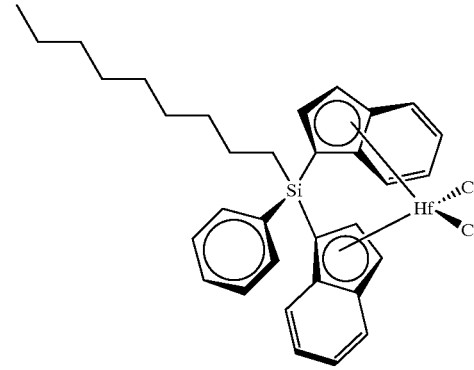

octylphenylsilylbis(1-indenyl)hafnium dichloride;

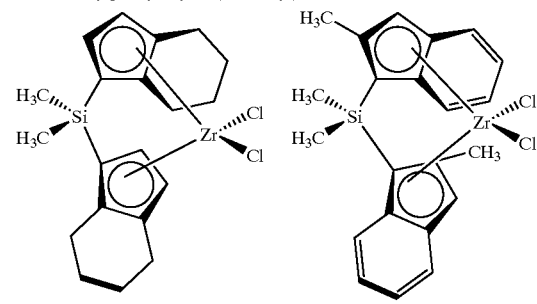

dimethylsilylbis(η⁵-4,5,6,7-tetrahydro-1-indenyl)zirconium dichloride;

dimethylsilylbis(2-methyl-1-indenyl)zirconium dichloride;

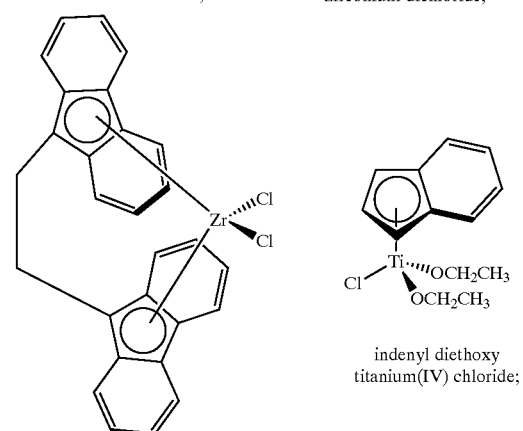

1,2-ethanediylbis(9-fluorenyl)zirconium dichloride;

indenyl diethoxy titanium(IV) chloride;

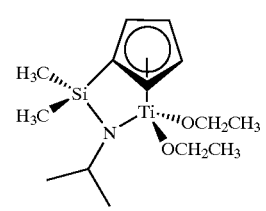

(isoproplamidodimethylsilyl)cyclopentadienyltitanium dichlordie;

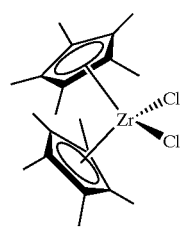

bis(pentamethylcyclopentadienyl)zirconium dichloride;

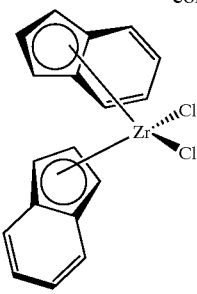

bis(indenyl) zirconium dichloride;

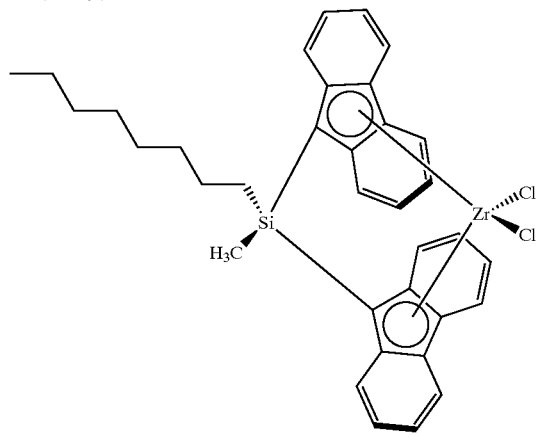

methyloctysilyl bis(9-fluorenyl) zirconium dichloride; and

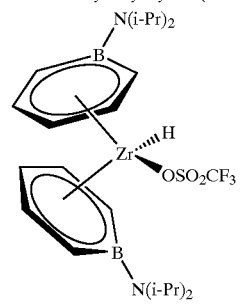

bis-[1-(N,N-diisopropylamino)broatabenzene] hydridozirconium trifluoromethylsulfonate.

Preferably, the organometal compound is selected from the group consisting of

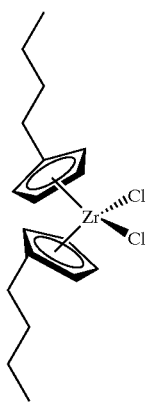

bis(n-butylcyclopentadienyl) zirconium dichloride;

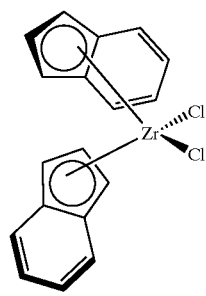

bis(indenyl)zirconium dichloride;

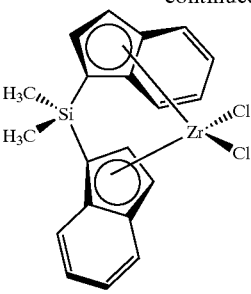

dimethylsilylbis(1-indenyl)zirconium dichloride; and

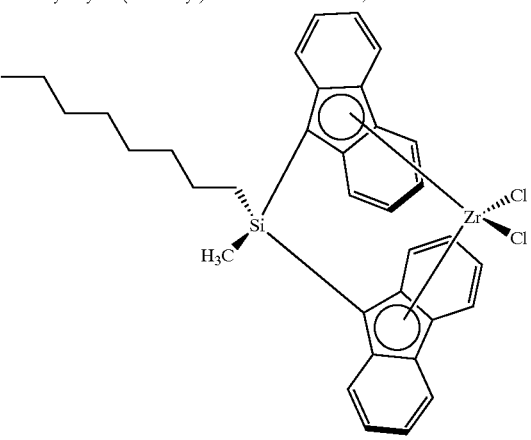

methyloctysilylbis(9-fluorenyl) zirconium dichloride.

Organoaluminum compounds have the following general formula:

$$Al(X^5)_n(X^6)_{3-n}$$

In this formula, $(X^5)$ is a hydrocarbyl having from 1 to about 20 carbon atoms. Currently, it is preferred when $(X^5)$ is an alkyl having from 1 to about 10 carbon atoms. However, it is most preferred when $(X^5)$ is selected from the group consisting of methyl, ethyl, propyl, butyl, and isobutyl.

In this formula, $(X^6)$ is a halide, hydride, or alkoxide. Currently, it is preferred when $(X^6)$ is independently selected from the group consisting of fluoro and chloro. However, it is most preferred when $(X^6)$ is chloro.

In this formula, "n" is a number from 1 to 3 inclusive. However, it is preferred when "n" is 3.

Examples of such compounds are as follows:
trimethylaluminum;
triethylaluminum (TEA);
tripropylaluminum;
diethylaluminum ethoxide;
tributylaluminum;
diisobutylaluminum hydride;
triisobutylaluminum hydride;
triisobutylaluminum; and
diethylaluminum chloride.
Currently, TEA is preferred.

The treated solid oxide compound comprises at least one halogen, zirconium, and a solid oxide compound. The halogen is at least one selected from the group consisting of chlorine, bromine, and fluorine. Generally, the solid oxide compound is selected from the group consisting of alumina, silica, aluminophosphate, aluminosilicate, and mixtures thereof. Preferably, the solid oxide compound is alumina. The solid oxide compound can be produced by any method known in the art, such as, for example, by gelling, co-gelling, impregnation of one compound onto another, and flame hydrolysis.

Generally, the surface area of the solid oxide compound after calcining at 500° C. is from about 100 to about 1000 m$^2$/g, preferably, from about 200 to about 800 m$^2$/g, and most preferably, from 250 to 600 m$^2$/g.

The pore volume of the solid oxide compound is typically greater than about 0.5 cc/g, preferably, greater than about 0.8 cc/g, and most preferably, greater than 1.0 cc/g.

To produce the treated solid oxide compound, at least one zirconium-containing compound is contacted with the solid oxide compound by any means known in the art to produce a zirconium-containing solid oxide compound. The zirconium can be added to the solid oxide compound before calcining or in a separate step after calcining the solid oxide compound.

Generally, the solid oxide compound is contacted with an aqueous or organic solution of the zirconium-containing compound before calcining. For example, the zirconium can be added to the solid oxide compound by forming a slurry of the solid oxide compound in a solution of the zirconium-containing compound and a suitable solvent such as alcohol or water. Particularly suitable are one to three carbon atom alcohols because of their volatility and low surface tension. A suitable amount of the solution is utilized to provide the desired concentration of zirconium after drying. Any water soluble or organic soluble zirconium compound is suitable that can impregnate the solid oxide compound with zirconium. Examples include, but are not limited to, zirconium tetrapropoxide, zirconyl nitrate, zirconium acetylacetonate, and mixtures thereof. Drying can be effected by any method known in the art. For example, said drying can be completed by suction filtration followed by evaporation, vacuum drying, spray drying, or flash drying.

If the zirconium is added after calcination, one preferred method is to impregnate the solid oxide compound with a hydrocarbon solution of a zirconium-containing compound, preferably a zirconium alkoxide or halide, such as, for example, $ZrCl_4$, $Zr(OR)_4$, and the like, where R is an alkyl or aryl group having 1 to about 12 carbons. Examples of the zirconium alkoxide include, but are not limited to, zirconium tetrapropoxide, zirconium tetrabutoxide, and the like.

Generally, the amount of zirconium present in the zirconium-containing solid oxide compound is in a range of about 0.1 to about 30 weight percent zirconium where the weight percent is based on the weight of the zirconium-containing solid oxide compound before calcining or the amount added to a precalcined solid oxide compound. Preferably, the amount of zirconium present in the zirconium-containing solid oxide compound is in a range of about 0.5 to about 20 weight percent zirconium based on the weight of the zirconium-containing solid oxide compound before calcining or the amount added to a precalcined solid oxide compound. Most preferably, the amount of zirconium present in the zirconium-containing solid oxide compound is in a range of 1 to 10 weight percent zirconium based on the weight of the zirconium-containing solid oxide compound before calcining or the amount added to a precalcined solid oxide compound.

Before or after the solid oxide compound is combined with the zirconium-containing compound to produce the zirconium-containing solid oxide compound, it is calcined for about 1 minute to about 100 hours, preferably from about 1 hour to about 50 hours, and most preferably, from 3 to 20 hours. Generally, the calcining is conducted at a temperature in a range of about 200° C. to about 900° C., preferably from about 300° C. to about 700° C., and most preferably, from 350° C. to 600° C. The calcining can be conducted in any suitable atmosphere. Generally, the calcining can be completed in an inert atmosphere. Alternatively, the calcining can be completed in an oxidizing atmosphere, such as, oxygen or air, or a reducing atmosphere, such as, hydrogen or carbon monoxide.

After or during calcining, the zirconium-containing solid oxide compound is contacted with at least one halogen-containing compound. The halogen-containing compound is selected from the group consisting of chlorine-containing compounds, bromine-containing compounds, and fluorine-containing compounds. The halogen-containing compound can be in a liquid phase, or preferably, a vapor phase. Optionally, the solid oxide compound can be calcined at 100 to 900° C. before being contacted with the halogen-containing compound.

Any method known in the art of contacting the solid oxide compound with the fluorine-containing compound can be used in this invention. A common method is to impregnate the solid oxide compound with an aqueous solution of a fluoride-containing salt before calcining, such as ammonium fluoride [$NH_4F$], ammonium bifluoride [$NH_4HF_2$], hydrofluoric acid [HF], ammonium silicofluoride [$(NH_4)_2SiF_6$], ammonium fluoroborate [$NH_4BF_4$], ammonium fluorophosphate [$NH_4PF_6$], and mixtures thereof.

In a second method, the fluorine-containing compound can be dissolved into an organic compound, such as an alcohol, and added to the solid oxide compound to minimize shrinkage of pores during drying. Drying can be accomplished by an method known in the art, such as, for example, vacuum drying, spray drying, flashing drying, and the like.

In a third method, the fluorine-containing compound can be added during the calcining step. In this technique, the fluorine-containing compound is vaporized into the gas stream used to fluidize the solid oxide compound so that it is fluorided from the gas phase. In addition to some of the fluorine-containing compounds described previously, volatile organic fluorides may be used at temperatures above their decomposition points, or at temperatures high enough to cause reaction. For example, perfluorohexane, perfluorobenzene, trifluoroacetic acid, trifluoroacetic anhydride, hexafluoroacetylacetonate, and mixtures thereof can be vaporized and contacted with the solid oxide compound at about 300 to about 600° C. in air or nitrogen. Inorganic fluorine-containing compounds can also be used, such as hydrogen fluoride or even elemental fluorine.

The amount of fluorine on the treated solid oxide compound is about 2 to about 50 weight percent fluorine based on the weight of the treated solid oxide compound before calcining or the amount added to a precalcined solid oxide compound. Preferably, it is about 3 to about 25 weight percent, and most preferably, it is 4 to 20 weight percent fluorine based on the weight of the treated solid oxide compound before calcining or the amount added to a pre-calcined solid oxide compound.

Any method known in the art of contacting the solid oxide compound with the chlorine-containing compound or bromine-containing compound can be used in this invention. Generally, the contacting is conducted during or after calcining, preferably during calcining. Any suitable chlorine-containing compound or bromine-containing compound that can deposit chlorine or bromine or both on the solid oxide compound can be used. Suitable chlorine-containing compounds and bromine-containing compound include volatile or liquid organic chloride or bromide compounds and inorganic chloride or bromide compounds. Organic chloride or bromide compounds can be selected from the group consisting of carbon tetrachloride, chloroform, dichloroethane, hexachlorobenzene, trichloroacetic acid, bromoform, dibromomethane, perbromopropane, phosgene, and mixtures thereof. Inorganic chloride or bromide compounds can be selected from the group consisting of gaseous hydrogen chloride, silicon tetrachloride, tin tetrachloride, titanium tetrachloride, aluminum trichloride, boron trichloride, thionyl chloride, sulfuryl chloride, hydrogen bromide, boron tribromide, silicon tetrabromide, and mixtures thereof Additionally, chlorine and bromine gas can be used. Optionally, a fluorine-containing compound can also be included when contacting the zirconium-containing solid oxide compound with the chlorine-containing compound or bromine-containing compound to achieve higher activity in some cases.

If an inorganic chlorine-containing compound or bromine-containing compound is used, such as titanium tetrachloride, aluminum trichloride, or boron trichloride, it also can be possible to contact the chlorine-containing compound or bromine-containing compound with the zirconium-containing solid oxide compound after calcining, either by vapor phase deposition or even by using an anhydrous solvent.

The amount of chlorine or bromine used is from about 0.01 to about 10 times the weight of the treated solid oxide compound before calcining or the amount added to a precalcined solid oxide compound, preferably it is from about 0.05 to about 5 times, most preferably from 0.05 to 1 times the weight of the treated solid oxide compound before calcining or the amount added to a precalcined solid oxide compound.

In another embodiment of this invention, an additional metal other than zirconium can be added to the treated solid oxide compound to enhance the activity of the organometal compound. For example, a metal, such as, zinc, silver, copper, antimony, gallium, tin, nickel, tungsten, and mixtures thereof, can be added. This is especially useful if the solid oxide compound is to be chlorided during calcining.

The catalyst compositions of this invention can be produced by contacting the organometal compound, the organoaluminum compound, and the treated solid oxide compound, together. This contacting can occur in a variety of ways, such as, for example, blending. Furthermore, each of these compounds can be fed into a reactor separately, or various combinations of these compounds can be contacted together before being further contacted in the reactor, or all three compounds can be contacted together before being introduced into the reactor.

Currently, one method is to first contact the organometal compound and the treated solid oxide compound together, for about 1 minute to about 24 hours, preferably, 1 minute to 1 hour, at a temperature from about 10° C. to about 200° C., preferably 15° C. to 80° C., to form a first mixture, and then contact this first mixture with an organoaluminum compound to form the catalyst composition.

Another method is to precontact the organometal compound, the organoaluminum compound, and the treated solid oxide compound before injection into a polymerization reactor for about 1 minute to about 24 hours, preferably, 1 minute to 1 hour, at a temperature from about 10° C. to about 200° C., preferably 20° C. to 80° C.

A weight ratio of the organoaluminum compound to the treated solid oxide compound in the catalyst composition ranges from about 5:1 to about 1:1000, preferably, from about 3:1 to about 1:100, and most preferably, from 1:1 to 1:50.

A weight ratio of the treated solid oxide compound to the organometal compound in the catalyst composition ranges from about 10,000:1 to about 1:1, preferably, from about 1000:1 to about 10:1, and most preferably, from 250:1 to 20:1. These ratios are based on the amount of the components combined to give the catalyst composition.

After contacting, the catalyst composition comprises a post-contacted organometal compound, a post-contacted organoaluminum compound, and a post-contacted treated solid oxide compound. Preferably, the post-contacted treated solid oxide compound is the majority, by weight, of the catalyst composition. Often times, specific components of a catalyst are not known, therefore, for this invention, the catalyst composition is described as comprising post-contacted compounds.

A weight ratio of the post-contacted organoaluminum compound to the post-contacted treated solid oxide compound in the catalyst composition ranges from about 5:1 to about 1:1000, preferably, from about 3:1 to about 1:100, and most preferably, from 1:1 to 1:50.

A weight ratio of the post-contacted treated solid oxide compound to the post-contacted organometal compound in the catalyst composition ranges from about 10,000:1 to about 1:1, preferably, from about 1000:1 to about 10:1, and most preferably, from 250:1 to 20:1. These ratios are based on the amount of the components combined to give the catalyst composition.

The catalyst composition of this invention has an activity greater than 100 grams of polymer per gram of treated solid oxide compound per hour, preferably greater than 500, and most preferably greater than about 1,000. This activity is measured under slurry polymerization conditions, using isobutane as the diluent, and with a polymerization temperature of 90° C., and an ethylene pressure of 550 psig. The reactor should have substantially no indication of any wall scale, coating or other forms of fouling.

One of the important aspects of this invention is that no aluminoxane needs to be used in order to form the catalyst composition. Aluminoxane is an expensive compound that greatly increases polymer production costs. This also means that no water is needed to help form such aluminoxanes. This is beneficial because water can sometimes kill a polymerization process. Additionally, it should be noted that no fluoro-organo borate compounds need to be used in order to form the catalyst composition. The treated solid oxide compound of this invention is inorganic when the treated solid oxide compound is formed, heterogenous in a organic polymerization medium, and can be can be easily and inexpensively produced because of the substantial absence of any aluminoxane compounds or fluoro-organo borate compounds. It should be noted that organochromium compounds and $MgCl_2$ are not needed in order to form the catalyst composition. Although aluminoxane, fluoro-organo borate compounds, organochromium compounds, and $MgCl_2$ are not needed in the preferred embodiments, these compounds can be used in other embodiments of this invention.

In another embodiment of this invention, a process comprising contacting at least one monomer and the catalyst composition to produce a polymer is provided. The term "polymer" as used in this disclosure includes homopolymers and copolymers. The catalyst composition can be used to polymerize at least one monomer to produce a homopolymer or a copolymer. Usually, homopolymers are comprised of monomer residues, having 2 to about 20 carbon atoms per molecule, preferably 2 to about 10 carbon atoms per molecule. Currently, it is preferred when at least one monomer is selected from the group consisting of ethylene, propylene, 1-butene, 3-methyl-1-butene, 1-pentene, 3-methyl-1- pentene, 4-methyl-1-pentene, 1-hexene, 3-ethyl-1-hexene, 1-heptene, 1-octene, 1-nonene, 1-decene, and mixtures thereof.

When a homopolymer is desired, it is most preferred to polymerize ethylene or propylene. When a copolymer is desired, the copolymer comprises monomer residues and one or more comonomer residues, each having from about 2 to about 20 carbon atoms per molecule. Suitable comonomers include, but are not limited to, aliphatic 1-olefins having from 3 to 20 carbon atoms per molecule, such as, for example, propylene, 1-butene, 1-pentene, 4-methyl-1-1-pentene, 1-hexene, 1-octene, and other olefins and conjugated or nonconjugated diolefins such as 1,3-butadiene, isoprene, piperylene, 2,3-dimethyl-1,3-butadiene, 1,4-pentadiene, 1,7-hexadiene, and other such diolefins and mixtures thereof. When a copolymer is desired, it is preferred to polymerize ethylene and at least one comonomer selected from the group consisting of 1-butene, 1-pentene, 1-hexene, 1-octene, and 1-decene. The amount of comonomer introduced into a reactor zone to produce a copolymer is generally from about 0.01 to about 10 weight percent comonomer based on the total weight of the monomer and comonomer, preferably, about 0.01 to about 5, and most preferably, 0.1 to 4. Alternatively, an amount sufficient to give the above described concentrations, by weight, in the copolymer produced can be used.

Processes that can polymerize at least one monomer to produce a polymer are known in the art, such as, for example, slurry polymerization, gas phase polymerization, and solution polymerization. It is preferred to perform a slurry polymerization in a loop reaction zone. Suitable diluents used in slurry polymerization are well known in the art and include hydrocarbons which are liquid under reaction conditions. The term "diluent" as used in this disclosure does not necessarily mean an inert material; it is possible that a diluent can contribute to polymerization. Suitable hydrocarbons include, but are not limited to, cyclohexane, isobutane, n-butane, propane, n-pentane, isopentane, neopentane, and n-hexane. Furthermore, it is most preferred to use isobutane as the diluent in a slurry polymerization. Examples of such technology can be found in U.S. Pat. Nos. 4,424,341; 4,501,885; 4,613,484; 4,737,280; and 5,597,892; the entire disclosures of which are hereby incorporated by reference.

The catalyst compositions used in this process produce good quality polymer particles without substantially fouling the reactor. When the catalyst composition is to be used in a loop reactor zone under slurry polymerization conditions, it is preferred when the particle size of the solid oxide compound is in the range of about 10 to about 1000 microns, preferably about 25 to about 500 microns, and most preferably, 50 to 200 microns, for best control during polymerization.

In a more specific embodiment of this invention, a process is provided to produce a catalyst composition, the process comprising (optionally, "consisting essentially of", or "consisting of"):

(1) contacting alumina with a solution containing zirconium tetraalkoxide, $(Zr(OR)_4)$, where R is an aliphatic radical containing one to twelve carbons, to produce a zirconium-containing alumina having from 1 to 10 weight percent zirconium based on the weight of the zirconium-containing alumina before calcining;

(2) calcining the zirconium-containing alumina at a temperature within a range of 350 to 600° C. for 3 to 20 hours to produce a calcined composition;

(3) contacting the calcined composition with carbon tetrachloride in the amount equal to 0.05 to 1 times the weight of the alumina before calcining for 10 minutes to 30 minutes to produce a chlorided, zirconium-containing alumina;

(4) combining the chlorided, zirconium-containing alumina and bis(n-butylcyclopentadienyl) zirconium dichloride at a temperature within a range of 15° C. to 80° C. for about 1 minute to 1 hour to produce a mixture; and (5) combining the mixture and triethylaluminum to produce the catalyst composition.

Hydrogen can be used with this invention in a polymerization process to control polymer molecular weight.

A feature of this invention is that the zirconium-containing solid oxide compound is a polymerization catalyst in it's own right, providing a high molecular weight component onto the usually symmetrical molecular weight distribution of the organometal compound. This component, or skewed molecular weight distribution, imparts higher melt strength and shear-response to the polymer than could be obtained from an organometal compound alone. Depending on the relative contributions of the zirconium-containing solid oxide compound and the organometal compound, a bimodal polymer distribution can be obtained.

After the polymers are produced, they can be formed into various articles, such as, for example, household containers and utensils, film products, drums, fuel tanks, pipes, geomembranes, and liners. Various processes can form these articles. Usually, additives and modifiers are added to the polymer in order to provide desired effects. It is believed that by using the invention described herein, articles can be produced at a lower cost, while maintaining most, if not all, of the unique properties of polymers produced with metallocene catalysts.

EXAMPLES

Testing Methods

A "Quantachrome Autosorb-6 Nitrogen Pore Size Distribution Instrument" was used to determined surface area and pore volume. This instrument was acquired from the Quantachrome Corporation, Syosset, N.Y.

Melt Index (MI) (g/10 min) was determined using ASTM D1238-95 at 190° C. with a 2,160 gram weight.

High Load Melt Index (HLMI)(g/10 min) was determined using ASTM D1238, Condition E at 190° C. with a 21,600 gram weight.

Solid Oxide Compounds

Silica was obtained from W. R. Grace, grade 952, having a pore volume of about 1.6 cc/g and a surface area of about 300 $m^2/g$.

A commercial alumina sold as Ketjen grade B alumina was obtained from Akzo Nobel Chemical having a pore volume of about 1.78 cc/g and a surface area of about 350 $m^2/g$.

Calcining

To calcine the solid oxide compounds, about 10 grams were placed in a 1.75 inch quartz tube fitted with a sintered quartz disk at the bottom. While the solid oxide compound was supported on the disk, dry air was blown up through the disk at the linear rate of about about 1.6 to about 1.8 standard cubic feet per hour. An electric furnace around the quartz tube was then turned on, and the temperature was raised at the rate of 400° C. per hour to the indicated temperature, such as 600° C. At that temperature, the solid oxide compound was allowed to fluidize for three hours in the dry air. Afterward, the solid oxide compound was collected and stored under dry nitrogen, where it was protected from the atmosphere until ready for testing. It was never allowed to experience any exposure to the atmosphere.

Polymerization Runs

Polymerization runs were made in a 2.2 liter steel reactor equipped with a marine stirrer running at 400 revolutions per minute (rpm). The reactor was surrounded by a steel jacket containing boiling methanol with a connection to a steel condenser. The boiling point of the methanol was controlled by varying nitrogen pressure applied to the condenser and jacket, which permitted precise temperature control to within half a degree centigrade, with the help of electronic control instruments.

A small amount (0.1 to 1.0 grams normally) of a halided solid oxide compound or inventive treated solid oxide compound was first charged under nitrogen to the dry reactor. Next, 2.0 milliliters of a toluene solution containing 0.5 percent by weight of bis(n-butylcyclopentadienyl) zirconium dichloride were added, followed by 0.6 liters of isobutane liquid. Then, 1.0 milliliter of a 1.0 molar solution of triethylaluminium (TEA) was added, followed by another 0.6 liters of isobutane liquid. Then, the reactor was heated up to the specified temperature, typically 90° C., and finally ethylene was added to the reactor to equal a fixed pressure of 550 psig unless stated otherwise. The reaction mixture was allowed to stir for up to one hour. As ethylene was consumed, more ethylene flowed in to maintain the pressure. The activity was noted by recording the flow of ethylene into the reactor to maintain the set pressure.

After the allotted time, the ethylene flow was stopped, and the reactor was slowly depressurized and opened to recover a granular polymer. In all cases, the reactor was clean with no indication of any wall scale, coating or other forms of fouling. The polymer was then removed and weighed. Activity was specified as grams of polymer produced per gram of halided solid oxide compound or treated solid oxide compound charged per hour (g/g/hr).

Description of Result

Specific examples of this invention are described below. The results of these polymerization tests are listed in Table 1.

Example 1

1-A (Control—Chlorided Alumina): Ketjen Grade B alumina was calcined in dry air at 600° C. for three hours. A sample of this material weighing 9.3 grams was heated to 600° C. under dry nitrogen and held at that temperature another three hours. Then 2.3 milliliters of carbon tetrachloride were injected into the nitrogen stream below the alumina, where it was vaporized and carried up through the alumina bed to produce a chlorided alumina. After all of the carbon tetrachloride had evaporated, the chlorided alumina was cooled to room temperature under nitrogen, then stored in an air-tight glass vessel until used for a polymerization test. When charged to the reactor with an organometal compound and TEA, it was found to yield an activity of 1066 grams of polymer per gram of chlorided alumina per hour. The polymer had a MI of 0.17 g/10 min, a HLMI of 2.8 g/10 min, and a HLMI/MI ratio of 16.5, reflecting the narrow molecular weight distribution which is typical of metallocene produced polymer.

1-B (Control—Chlorided, Zirconium-Containing Alumina): Ketjen Grade B alumina was calcined in dry air at 600° C. for three hours. A sample of this material weighing 19.7 grams was impregnated with a solution containing 9.0 milliliters of 80 wt % zirconium tetrabutoxide in butanol (1.049 g/ml and 31 milliliters of dry heptane to produce a zirconium-containing alumina. The excess solvent was evaporated off under a dry nitrogen flow at about 80° C. The zirconium-containing alumina was then calcined at 500° C. under nitrogen, and during this process, 3.0 milliliters of carbon tetrachloride were injected into the gas stream to produce a chlorided, zirconium-containing alumina. After substantially all of the carbon tetrachloride had evaporated and passed up through the zirconium-containing alumina bed at 500° C., the chlorided, zirconium-containing alumina was stored under nitrogen.

The chlorided, zirconium-containing alumina was then tested for polymerization activity with triethylaluminum, but in the absence of an organometal compound. It yielded 862 grams of polymer per gram of chlorided, zirconium-containing alumina per hour, demonstrating the inherent activity of the treated solid oxide compound itself. The polymer had a MI of zero and a HLMI of zero, indicating the extremely high molecular weight obtained from such zirconium catalysts.

1-C (Inventive—Chlorided, Zirconium-Containing Alumina): The same chlorided, zirconium-containing alumina of Example 1-B was retested for polymerization activity but in the presence of an organometal compound, as indicated in the procedure described previously. It produced 1484 grams of polymer per gram of chlorided, zirconium-containing alumina per hour, indicating the additional contribution of the organometal compound. Thus, chlorided, zirconium-containing alumina exhibited an activity comparable to that of the chlorided alumina control in example 1-A, however the polymer was much different. The polymer had a MI of zero and a HLMI of zero, indicating the high molecular weight contribution from the zirconium.

Example 2

2-A (Control—Chlorided Silica): Davison Grade 952 silica was calcined in dry air at 600° C. for three hours. A sample of this material weighing about 10 grams was heated to 600° C. under dry nitrogen, then 2.3 milliliters of carbon tetrachloride were injected into the nitrogen stream below the silica (as in example 1), where it was vaporized and carried up through the silica bed to produce a chlorided silica. After all of the carbon tetrachloride had evaporated, the chlorided silica was cooled to room temperature under nitrogen, then stored in an air-tight glass vessel until used for a polymerization test. When charged to the reactor with an organometal compound and TEA, it was found to produce no polymer.

2-B (Inventive—Chlorided Zirconium-Containing Silica): A sample of Davison grade 952 silica weighing 50 grams was impregnated with 75 milliliters of a solution of 80% zirconium butoxide in butanol to produce a zirconium-containing silica. Then, another 50 milliliters of a solution of 25 milliliters of water and 25 milliliters of propanol were added to hydrolyze the zirconium butoxide. This mixture was dried under vacuum for 16 hours at 120° C. A sample of the zirconium-containing silica weighing 15.90 grams was heated to 600° C. in dry nitrogen for 2 hours. Then, 1.0 milliliter of carbon tetrachloride was injected into the nitrogen flow to chloride the zirconium-containing silica to produce a chlorided, zirconium-containing silica. Once substantially all the carbon tetrachloride had evaporated, the chlorided, zirconium-containing silica was stored under dry nitrogen.

The chlorided, zirconium-containing silica was then tested for polymerization activity with triethylaluminum and an organometal compound as described previously. It yielded 123 grams of polymer per gram of chlorided, zirconium-containing silica per hour. While this number is low, it is a considerable improvement over the chlorided silica control run in Example 2-A, which yielded no polymer at all. This indicates the ability of the chlorided zirconium-containing silica to activate the organometal compound.

Again, this polymer had a MI of zero and a HLMI of zero, showing the contribution of the zirconium.

2-C (Inventive—Chlorided Zirconium-Containing Silica): The chlorided, zirconium-containing silica of Example 2-B was tested again for polymerization activity with an organometal compound and triethylaluminum, except that 20 psig of hydrogen was also added to the reactor to reduce the molecular weight of the polymer produced. The run produced a comparable activity, but the molecular weight did not decrease enough to make much of a change. The MI remained zero, and the HLMI only increased to 0.02. Again, this demonstrates the contribution of the zirconium.

2-D (Inventive—Chlorided, Zirconium-Containing Silica): The chlorided, zirconium-containing silica of Example 2-B was tested again for polymerization activity with an organometal compound and triethylaluminum, except that 50 psig of hydrogen was added to the reactor to further reduce the molecular weight of the polymer produced. The run again produced a comparable activity, and the molecular weight decreased enough to yield a MI of 0.14 and a HLMI of 8.94. This gives a broad molecular weight distribution as indicated by the HLMI/MI ratio of 64.8, which is much broader than the organometal compound control in Example 1-A. The broad molecular weight distribution is the result of contributions from the organometal compound and the chlorided, zirconium-containing silica.

2-E (Inventive—Chlorided, Zirconium-Containing Silica): The chlorided, zirconium-containing silica of Example 2-B was tested again for polymerization activity with an organometal compound and triethylaluminum, adding 50 psig of hydrogen again as in Example 2-D. The run again produced a comparable activity, and the molecular weight decreased enough to yield a MI of 0.18 and a HLMI of 10.9. This gives a broad molecular weight distribution as indicated by the HLMI/MI ratio of 59.6, which is much broader than the organometal compound control in Example 1-A. Again, the broad molecular weight distribution is the result of contributions from the organometal compound and the chlorided, zirconium-containing silica Example 3

3-A (Control—Fluorided Alumina): Ketjen Grade B alumina was calcined in dry air at 600° C. for three hours. A sample of the alumina weighing 12.3 grams was impregnated with 25 milliliters of an aqueous solution containing 1.25 grams of dissolved ammonium bifluoride and dried in a vacuum oven overnight at 120° C. to produce a fluorided alumina. It was then heated to 600° C. under dry nitrogen and held at that temperature for three hours. The fluorided alumina then was cooled to room temperature under nitrogen and stored in an air-tight glass vessel until used for a polymerization test. When charged to the reactor with an organometal compound and TEA, it was found to yield an activity of 1250 grams of polymer per gram of fluorided alumina per hour. The polymer had a MI of 0.21, a HLMI of 3.48, and a HLMI/MI ratio of 16.6, reflecting the narrow molecular weight distribution which is typical of metallocene produced polymer.

3-B (Control—Fluorided Zirconium-Containing Alumina): Kejten Grade B alumina was calcined in dry air at 600° C. for three hours. A sample of the alumina weighing 19.7 grams was impregnated with a solution containing 9.0 milliliters of 80 wt % zirconium tetrabutoxide in butanol (1.049 g/ml) and 31 milliliters of dry heptane to produce a zirconium-containing alumina. The excess solvent was evaporated off under a dry nitrogen flow at about 80° C. A sample of the zirconium-containing alumina weighing 16.80 grams was then calcined at 600° C. under nitrogen, and during this process 3.0 milliliters of perfluorohexane were injected into the gas stream to produce a fluorided, zirconium-containing alumina After substantially all of the perfluorohexane had evaporated and passed up through the zirconium-containing alumina bed at 600° C., the gas stream was switched to dry air for 40 minutes. Finally, the fluorided, zirconium-containing alumina was stored under nitrogen.

The fluorided, zirconium-containing alumina was then tested for polymerization activity with TEA but in the absence of an organometal compound. It produced 35 grams of polymer per gram of fluorided, zirconium-containing alumina per hour, indicating that the activity of the fluorided, zirconium-containing alumina is much less than the activity of the chlorided, zirconium-containing alumina in Example 1-B. The polymer obtained had a MI of zero and a HLMI of zero indicating that the fluorided, zirconium-containing alumina also produced extremely high molecular weight polymer.

3-C (Inventive—Fluorided, Zirconium-Containing Alumina): The fluorided, zirconium-containing alumina of Example 3-B was retested for polymerization activity but this time in the presence of an organometal compound as described in the polymerization procedure. This time the fluorided, zirconium-containing alumina produced a much higher activity of 1382 grams of polymer per gram of fluorided, zirconium-containing alumina, indicating the ability of the fluorided, zirconium-containing alumina to also activate the organometal compound. The polymer had a MI of zero and a HLMI of 1.74 which is intermediate between the organometal compound in Example 3-A and the fluorided, zirconium-containing alumina in Example 3-B. Thus, a broader molecular weight distribution was obtained.

Example 4

4-A (Inventive—Fluorided, Zirconium-Containing Alumina): Ketjen grade B alumina (100–200 mesh, uncalcined) was impregnated with 40 milliliters of a solution made from 20 milliliters of isopropyl alcohol and 24 milliliters of an 80 wt % zirconium tetrabutoxide solution in butanol (1.049 g/ml) to produce a zirconium-containing alumina. The zirconium-containing alumina was dried under vacuum at 120° C. overnight. 11.17 grams of the zirconium-containing alumina were calcined at 600° C. in dry air for three hours. Then, 5.0 milliliters of perfluorohexane were injected into the air flow to fluoride the zirconium-containing alumina to produce a fluorided zirconium-containing alumina. Once all of the perfluorohexane had evaporated and passed up through the zirconium-containing alumina bed, the fluorided zirconium-containing alumina was cooled and stored under dry nitrogen.

The fluorided, zirconium-containing alumina was then tested for polymerization activity with an organometal compound and triethylaluminum. It produced an activity of 924 grams of polymer per gram of fluorided, zirconium-containing alumina per hour. The polymer had a MI of 0.03 and a HLMI of 2.26, providing an HLMI/MI ratio of 83.6, which is considerably higher than the pure organometal compound control in Example 3-A. The higher shear ratio indicates a broader molecular weight distribution, caused by the additional contribution of the fluorided, zirconium-containing alumina. The fluorided, zirconium-containing alumina introduces a small but extremely high molecular weight polymer component, which accounts for about 4% of the overall polymer molecular weight distribution in this example.

4-B (Inventive—Fluorided, Zirconium-Containing Alumina): To further lower the molecular weight of the polymer obtained, the fluorided, zirconium-containing alumina of Example 4-A was tested again for polymerization activity with an organometal compound and triethylaluminum, except that the ethylene pressure was reduced from the usual 550 psig to 450 psig, and 25 milliliters of 1-hexene was also added to make an ethylene-hexene copolymer. Under these conditions, the fluorided, zirconium-containing alumina produced 523 grams of polymer per gram of fluorided, zirconium-containing alumina per hour. The activity is lower when compared to Example 4-A due to the lower ethylene concentration used. The polymer was found to have a MI of 0.30 and a HLMI of 6.38 giving a HLM/MI ratio of 21.1. Again, the higher shear ratio indicates a broader molecular weight distribution than that obtained from the organometal compound in Example 3-A due to the additional contribution of the fluorided, zirconium-containing alumina. The fluorided, zirconium-containing alumina introduces a small but extremely high molecular weight component, which accounts for about 7% of the overall polymer molecular weight distribution in this example.

to 30 minutes to produce a chlorided, zirconium-containing alumina;

(4) combining the chlorided, zirconium-containing alumina and bis(n-butylcyclopentadienyl) zirconium dichloride at a temperature within a range of 15° C. to 80° C. for about 1 minute to 1 hour to produce a mixture; and (5) combining the mixture with triethylaluminum to produce the catalyst composition.

2. An article that comprises the polymer produced according to claim 1.

3. The The polymer of claim 1, wherein the zirconium tetraalkoxide is zirconium tetrapropoxide or zirconium tetrabutoxide.

4. The polymer of claim 1, wherein the chlorided zirconium-containing alumina is contacted with at least one additional metal.

5. The polymer of claim 4, wherein the one additional metal is selected from zinc, silver, copper, antimony, gallium, tin, nickel, tungsten, or mixtures thereof.

6. The polymer of claim 1, wherein the polymerization conditions comprise slurry polymerization conditions.

7. The polymer of claim 6, wherein the polymerization takes place in a loop reaction zone.

TABLE 1

| Example | Test Compound | Organometal Compound | Test Compound (g) | Polymer Yield (g) | Run Time (minutes) | Activity g/g/hr | Comments | MI (g/10 min) | HLMI (g/10 min) | HLMI/MI |
|---|---|---|---|---|---|---|---|---|---|---|
| 1A Control | Cl-Alumina | Yes | 1.1281 | 100.2 | 5.0 | 1066 | | 0.17 | 2.8 | 16.5 |
| 1B Control | Cl—Zr/Alumina | None | 0.4585 | 247.0 | 37.5 | 862 | | 0.00 | 0.00 | |
| 1C Inventive | Cl—Zr/Alumina | Yes | 0.0874 | 110.0 | 50.9 | 1484 | | 0.00 | 0.00 | |
| 2A Control | Cl-Silica | Yes | 0.4414 | 0 | 60.0 | 0 | | | | |
| 2B Inventive | Cl—Zr/Silica | Yes | 0.3608 | 31.3 | 42.2 | 123 | | 0.00 | 0.00 | |
| 2C Inventive | Cl—Zr/Silica | Yes | 0.2826 | 30.6 | 60.9 | 107 | 20 psig H$_2$ | 0.00 | 0.02 | |
| 2D Inventive | Cl—Zr/Silica | Yes | 0.4136 | 43.5 | 62.0 | 102 | 50 pisg H$_2$ | 0.14 | 8.94 | 64.8 |
| 2E Inventive | Cl—Zr/Silica | Yes | 0.4503 | 43.2 | 60.0 | 96 | 50 pisg H$_2$ | 0.18 | 10.90 | 59.6 |
| 3A Control | F-Alumina | Yes | 0.2253 | 281.6 | 60.0 | 1250 | | 0.21 | 3.48 | 16.6 |
| 3B Control | F—Zr/Alumina | None | 0.1522 | 3.0 | 33.4 | 35 | | 0.00 | 0.00 | |
| 3C Inventive | F—Zr/Alumina | Yes | 0.0832 | 120.0 | 62.6 | 1382 | | 0.00 | 1.74 | |
| 4A Inventive | F—Zr/Alumina | Yes | 0.5510 | 331.0 | 39.0 | 924 | | 0.03 | 2.26 | 83.6 |
| 4B Inventive | F—Zr/Alumina | Yes | 0.0960 | 50.5 | 60.3 | 523 | 450 psig ethylene 25 mls hexene | 0.30 | 6.38 | 21.1 |

*Activity = grams of polymer per gram of test compound per hour.

While this invention has been described in detail for the purpose of illustration, it is not intended to be limited thereby but is intended to cover all changes and modifications within the spirit and scope thereof.

That which is claimed is:

1. A polymer produced using a polymerization process comprising contacting, under polymerization conditions, at least one monomer and a catalyst composition which is substantially free of aluminoxanes;

wherein the catalyst composition is produced by a process comprising:

(1) contacting alumina with a solution containing a zirconium tetraalkoxide, $(Zr(OR)_4)$, where R is an aliphatic radical containing one to twelve carbons, to produce a zirconium-containing alumina having from 1 to 10 weight percent zirconium based on the weight of the zirconium-containing alumina before calcining;

(2) calcining the zirconium-containing alumina at a temperature within a range of 350 to 600° C. for 3 to 20 hours to produce a calcined composition;

(3) contacting the calcined composition with carbon tetrachloride in an amount equal to 0.05 to 1 times the weight of the alumina before calcining for 10 minutes 8. The polymer of claim 7, wherein the polymerization is conducted in the presence of a diluent that comprises, in major part, isobutane.

9. The polymer of claim 1, wherein the catalyst composition has an activity greater than 500 g/g/hr under slurry polymerization conditions, using isobutane as a diluent, with a polymerization temperature of 90° C., and an ethylene pressure of 550 psig.

10. The polymer of claim 1, wherein at least one monomer is ethylene.

11. The polymer of claim 1, wherein the polymer comprises ethylene and at least one aliphatic 1-olefin having 3 to 20 carbon atoms per molecule.

12. The polymer of claim 11, wherein the aliphatic 1-olefin having 3 to 20 carbon atoms per molecule is selected from propylene, 1-butene, 1-pentene, 4-methyl-1-pentene, 1-hexene, or 1-octene, or mixture thereof.

13. The polymer of claim 1, wherein at least one monomer is selected from ethylene, propylene, 1-butene, 3-methyl-1-butene, 1-pentene, 3-methyl-1-pentene, 4-methyl-1-pentene, 1-hexene, 3-ethyl-1-hexene, 1-heptene, 1-octene, 1-nonene, 1-decene, 1,3-butadiene, isoprene, piperylene, 2,3-dimethyl-1,3-butadiene, 1,4-pentadiene, 1,7-hexadiene or mixture thereof.

14. The polymer of claim 1, wherein the weight ratio of the post-contacted triethylaluminum to the post-contacted chlorided zirconium-containing alumina in the catalyst composition ranges from about 5:1 to about 1:1000.

15. The polymer of claim 1, wherein the weight ratio of the post-contacted chlorided zirconium-containing alumina to the post-contacted bis(n-butylcyclopentadienyl) zirconium dichloride in the catalyst composition ranges from about 10,000:1 to about 1:1.

16. The article of claim 2, wherein the article is selected from household containers, utensils, film products, drums, fuel tanks, pipes, geomembranes or liners.

* * * * *